United States Patent [19]

Bakos et al.

[11] Patent Number: 4,804,595

[45] Date of Patent: Feb. 14, 1989

[54] NON-AQUEOUS ELECTROLYTES FOR LITHIUM BATTERIES

[75] Inventors: Vincent W. Bakos; David J. Steklenski, both of Rochester, N.Y.

[73] Assignee: Eastman Kodak Company, Rochester, N.Y.

[21] Appl. No.: 144,158

[22] Filed: Jan. 15, 1988

[51] Int. Cl.$^4$ .............................................. H01M 6/14
[52] U.S. Cl. ..................................... 429/194; 429/197
[58] Field of Search ................................ 429/199, 197

[56] References Cited

U.S. PATENT DOCUMENTS

| | | | |
|---|---|---|---|
| 3,511,716 | 5/1970 | Gabano et al. | 429/197 |
| 3,953,234 | 4/1976 | Hoffmann | 429/199 |
| 4,419,423 | 12/1983 | Leger | 429/197 |
| 4,499,161 | 2/1985 | Foos | 429/194 |

OTHER PUBLICATIONS

Extended Abstracts, vol. 86-2, Electrochemical Society Fall Meeting San Diego, CA, 1986, Abstract No. 21, Foos et al. "A New Chelating Ether Solvent for Rechargeable Lithium Batteries".

Extended Abstracts, p. 88–86, Electrochemical Society 3rd Int'l. Meeting on Lithium Batteries, Kyoto, Japan, 1986, Furkukawa et al, "Effects of Various Electrolytes on Characteristics of Managanese Dioxide-Lithium Cells".

*Primary Examiner*—Stephen J. Kalafut
*Attorney, Agent, or Firm*—John R. Everett

[57] ABSTRACT

An electrochemical cell comprising a lithium anode, a cathode and an electrolyte having a conductivity, in reciprocal ohms per cm (mmho/cm), of at least 3.5 and comprising a lithium salt and 1,2-dimethoxypropane is disclosed.

15 Claims, No Drawings

NON-AQUEOUS ELECTROLYTES FOR LITHIUM BATTERIES

FIELD OF THE INVENTION

This invention relates to electrolytes and their use in Li/MnO$_2$ electrochemical cells.

BACKGROUND OF THE INVENTION

One of the best-known organic solvents used in non-aqueous lithium (Li) electrochemical cell electrolytes is 1,2-dimethoxyethane (DME). For example, it is disclosed as part of the electrolyte mixture in U.S. patent application Ser. No. 735,406, now U.S. Pat. No. 4,761,352.

DME has a low viscosity and a low dielectric constant, it is commonly mixed with another polar aprotic solvent having a higher dielectric constant (e.g., propylene carbonate, ethylene carbonate, or γ-butyrolactone) for use in practical Li cells and batteries. Such a solvent mixture possesses better properties for the ionization of Li salts and wetting of the electrode and separator surfaces than either of the component solvents alone. Enhanced cell performance results from the mixture.

While cyclic ethers such as tetrahydrofuran or 1,3-dioxolane may also serve as the ether component of a non-aqueous electrolyte for lithium batteries, the aliphatic diether, DME, has often been the ether of choice of lithium cell designers over the last decade or more because it has generally conferred superior electrical performance to the lithium battery when present as the ether component of a lithium battery electrolyte.

Replacement of DME in Li cell electrolytes is desirable. Under short-circuit conditions, the internal temperature of a Li cell can rise quickly to greater than 100° C. DME, which boils at 85° C., can cause elevated internal pressure which might result in battery venting.

It is known from the prior art that selection of suitable solvents for nonaqueous organic electrolytes is particularly troublesome. For example, U.S. Pat. No. 4,419,423 discloses that many of the solvents used to prepare electrolytes which are sufficiently conductive to permit effective ion migration through electrolyte solutions are reactive with the highly active anodes such as lithium. Other solvents investigated could not be used with high energy density cathode materials such as manganese dioxide, and were sufficiently corrosive to lithium anodes to prevent efficient performance over any length of time.

U.S. Pat. No. 4,419,423 also asserts that "While the theoretical energy, i.e. the electrical energy potential available from a selected anodecathode couple, is relatively easy to calculate, there is a need to choose a non-aqueous electrolyte for a couple that permits the actual energy produced by an assembled battery to approach the theoretical energy. The problem usually encountered is that it is practically impossible to predict in advance how well, if at all, a non-aqueous electrolyte will function with a selected couple. Thus, a cell must be considered as a unit having three parts: a cathode, an anode and an electrolyte, and it is to be understood that the parts of one cell are not predictably interchangeable with parts of another cell to produce an efficient and workable cell" (emphasis added).

Underscoring this understanding of electrochemical cell combinations is the fact that organic ethers such as 1,1-dimethoxypropane; 2,2-dimethoxypropane; 1,1-diethoxypropane and 1,2-di-n-butoxyethane cannot be used as co-solvents with propylene carbonate in electrolyte solvent mixtures because such ethers are not miscible with propylene carbonate homogeneously. Also the conductivity of 1,1-dimethoxyethane and 2,2-dimethoxypropane is too low. Also it has been reported that the homologue of DME, 1,3-dimethoxypropane is difficult to make and is not available commercially.

SUMMARY OF THE INVENTION

The present invention provides an electrochemical cell comprising a lithium anode, a cathode and an electrolyte having a conductivity in reciprocal ohms per cm (mmho/cm) of at least 3.5 and comprising a lithium salt and a 1,2-dimethoxypropane (1,2-DMP).

In a preferred embodiment, the present invention provides an electrochemical cell comprising a lithium anode, a cathode and an electrolyte having a conductivity of at least 3.5 mmho/cm and a lithium salt and a solvent mixture comprising (a) 10 to 40 volume percent propylene carbonate (PC);
(b) 20 to 40 volume percent ethylene carbonate (EC); and
(c) 30 to 60 volume percent 1,2-dimethoxypropane.

The electrolytes of this invention are comparable in performance to prior art electrolytes comprising 1,2-dimethoxyethane in low drain rate cells. The preferred embodiments are comparable in performance to electrolytes comprising 1,2-dimethoxyethane in medium drain rate cells. In some preferred embodiments the electrolytes of this invention provide greater stability to Li/MnO$_2$ electrochemical cells than prior art electrolytes containing DME.

In view of unsuitability of structurally similar ethers for use in electrochemical cells, and the unpredictability of electrochemical cell performance when one or more components are changed, the utility of 1,2-DMP in electrochemical cells is unobvious.

DETAILS OF THE INVENTION

The branched ether used in this invention, 1,2-dimethoxypropane, is useful in electrolyte solvent mixtures comprising one or more co-solvents. This is supported by the following experimental data showing 1,2-dimethoxypropane in Li/MnO$_2$ and Li/FeS$_2$ cells with a single co-solvent and with two co-solvents.

1. Electrolytes comprising 1,2-dimethoxy-propane and two co-solvents.

The utility of the three solvent electrolyte mixtures of this invention was demonstrated in Li/MnO$_2$ electrochemical cells having an accordion folded electrode assembly. Accordion folded electrode assemblies are the subject of U.S. Pat. application No. 735,406 (now U.S. Pat. No. 4,761,352, issued Aug. 2, 1988) filed May 17, 1985, in the name of Bakos et al which is expressly incorporated herein by reference. This assembly was prepared as follows.

The anode was essentially a three piece laminate comprised of lithium coated on a 1 mil (0.0254 mm) stainless steel foil current collector. A portion of the stainless steel foil was left uncoated and trimmed to form an anode terminal. A separator such as Celgard TM 4510 (available from Celanese) and/or nonwoven polypropylene was rolled over the entire lithium anode. The separator is a porous electrically-insulating material which prevents electrical contact between the anode and the cathode but allows movement of ions.

The cathode was a laminate comprising a stainless steel grid current collector coated on one or both sides with a mixture of $MnO_2$, carbon and Teflon ™. A small portion of the stainless steel current collector was left uncoated and shaped at one end to function as a cathode terminal.

A complete electrode assembly was made by positioning the cathode on top of the separator attached to the anode so that the cathode terminal and the anode terminal were side by side, but not in electrical contact. The cathode, in this embodiment, was about one-half the length of the anode. The entire anode was then folded over the entire cathode to form a laminate structure in which the cathode was sandwiched between the folds of the anode.

Next, the complete electrode assembly was accordion folded manually.

After checking for internal electrical shorts with an ohmmeter, the electrode assembly was made into an electrochemical cell or battery by first inserting the assembly into a container. An electrolyte composition of this invention was then added to the container.

The electrode assembly was inserted into a container so that the electrode terminals protrude upward forming a complete electrochemical cell or battery. The cell can be sealed with a cap.

All cells used in the following examples were prepared as described above. Each had a Li anode and a cathod composed of a compressed dry mixture of 88:6:6 weight percent electrolytic manganese dioxide, carbon and polytetrafluoroethylene.

Lithium trifluoromethanesulfonate ($CF_3SO_3Li$), dried at 120° C. for 48 hours before use, was the electrolyte salt used in all of the electrolytes tested herein. In all cases, a 1M concentration was used. Concentrations of 0.5 to 2M of $CF_3SO_3Li$, $LiAsF_6$ and mixtures thereof within this range would also be useful in the cells of this invention. Other lithium salts such as $LiClO_4$ well known for use in Li cells can be used. The electrolytes were prepared in a VAC glove box under Helium to keep them oxygen and water-free.

After assembly, the cells were galvanostatically predischarged at a current of 0.5 A to 5 percent depth-of-discharge based on their theoretical capacity. After a rest period (usually overnight), cells were continuously discharged through a load resistance of 30.0Ω to a 1.8 V cutoff. This test corresponds to a 80 mA test for 9 V batteries (90.0Ω load, 5.4 V cutoff).

Stability testing was performed by letting the predischarged cells stand overnight at room temperature. They were then incubated at 70° C. in an oven continuously purged with $N_2$ for a period of 24 hours. The cells were then cooled overnight, weighed to insure no significant electrolyte loss, and discharged as described above.

Electrolyte conductivity measurements were made in a Vacuum Atmospheres glove box under Helium using a Yellow Springs Instruments Model 32 conductance meter equipped with a dip cell. About 9 mL of the solution was used for each measurement. The standard solution used to obtain the cell constant was 0.135M $KCL/H_2O$ ($\sigma = 15.7$ mmho/cm).

Cell impedance measurements were made with a Hewlett-Packard Model 4276A LCZ meter at a frequency of 1 kHz. Cells were held in an upright position during the measurements.

EXAMPLES 1–7

Seven different electrolyte compositions of this invention were evaluated under a 30.0Ω load to a 1.8 V cutoff. The volume percent of each solvent is listed in Tables I and II. Performance was compared to a control electrolyte γ-butyrolactone (BL) and DME used in some prior art $Li/MnO_2$ cells. The test performance of the electrolytes of this invention was 97–99 percent that of the control. The 20:30:50 PC:EC:DMP composition appeared to give the best results relative to control performance. Thus, the electrolytes of this invention are capable of substantially achieving the performance of the control. This means that DME can be replaced without significant loss in cell performance.

TABLE I

Test Performance of W-Fold Cells with PC:EC:DMP Electrolytes at Room Temperature

| Solvent Composition | Control BL:DME | Invention PC:EC:1,2-DMP | | |
|---|---|---|---|---|
| | 70:30 | 40:20:40 | 20:40:40 | 25:25:50 |
| Conductivity (mmho/cm[a]) | 5.3 | 4.1 | 4.6 | 4.5 |
| No. Cells | 21 | 9 | 9 | 9 |
| g Cathode | 5.93 | 5.93 | 5.94 | 5.92 |
| Avg. Current (mA) | 77.4 | 76.9 | 79.2 | 78.7 |
| % Coul Yield | 66.6 | 61.5 | 61.0 | 65.8 |
| Life, Hours[b] | 11.6 | 10.8 | 10.4 | 11.3 |

[a] 1 M $CF_3SO_3Li$ solution
[b] Normalized to 5.95 g cathode
Life, Hours - the time it took for a cell to reach cutoff voltage during constant discharge.

TABLE II

Performance of W-Fold Cells with PC:EC:DMP Electrolytes at Room Temperature

| Solvent Composition | Control BL:DME | Invention PC:EC:1,2-DMP | | | |
|---|---|---|---|---|---|
| | 70:30 | 25:25:50 | 20:30:50 | 15:35:50 | 10:40:50 |
| Conductivity (mmho/cm[a]) | 5.3 | 4.5 | 4.6 | 4.7 | 4.9 |
| No. of Cells | 20 | 10 | 10 | 8 | 10 |
| g Cathode | 5.65 | 5.64 | 5.65 | 5.65 | 5.63 |
| Avg. Current (mA) | 77.9 | 78.4 | 79.2 | 79.3 | 79.4 |
| % Coul Yield | 68.5 | 66.8 | 69.0 | 67.9 | 68.3 |
| Life, Hours[b] | 11.2 | 10.85 | 11.1 | 10.9 | 11.0 |

[a] 1 M $CF_3SO_3Li$ solution
[b] Normalized to 5.65 g cathode

EXAMPLE 8

Stability testing was done on various electrolyte mixtures of the invention. The performance tests were the same as in examples 1–7. The incubation time was 24 hours at 70° C. Measurements were made at room temperature. The results are given in Table III. The PC:EC:1,2-DMP electrolyte gave no observable rise in cell impedance during the heating cycle. However, the BL+DME electrolyte control showed a large increase. The performance of cells stored at room temperature was about the same for the control and the electrolytes of this invention. The stability of the electrolytes of the invention is clearly superior to the control. This conclusion is established by the difference in capacity and service life loss between the control cell and the cells containing electrolytes of the invention.

TABLE III

Stability Test of W-Fold Li/MnO$_2$ Cells

| | Control | Invention 1 M CF$_3$SO$_3$Li PC:EC:1,2-DMP 25:25:50 | |
|---|---|---|---|
| Salt (1 M) | CF$_3$SO$_3$Li | | |
| Solvent | BL:DME | | |
| Composition | 70:30 | Experiment 1 | Experiment 2 |
| Room Temp.: | | | |
| No. Cells | 9 | 9 | 9 |
| Avg. Current (mA) | 78.3 | 79.3 | 79.7 |
| % Coul Yield | 68.1 | 67.8 | 69.0 |
| Life, Hours[b] | 11.1 | 10.9 | 11.0 |
| 1 kHz Impedance (Ω) | 1.9 | 1.5 | 1.5 |
| 70° C., 24 Hours: | | | |
| No. Cells | 10 | 9 | 8 |
| Avg. Current (mA) | 77.2 | 79.3 | 79.4 |
| % Coul Yield | 65.0 | 67.3 | 69.9 |
| Life, Hours[b] | 10.7 | 10.8 | 11.2 |
| 1 kHz Impedance (Ω) | 3.1 | 1.6 | 1.5 |
| % Capacity Loss[b] | 4.6 | 0.8 | +1.2 |
| % Service Life Loss[b] | 3.3 | 0.8 | +1.6 |

[a]Normalized to 5.65 g cathode
[b]percent loss of original capacity and service life lost by incubated cells relative to unincubated cells 2. Electrolytes comprising 1,2-dimethoxypropane and a single co-solvent.

EXAMPLE 9

Experiments were conducted with other ether solvents in an effort to identify a single solvent for replacement of DME. The ether solvents tested were 1,2-diethoxyethane (DEE); 1-tert-butoxy-2 methoxyethane (TBME); 1,2-dimethoxypropane (1,2-DMP) and 1-ethoxy-2-methoxy ethane (EME). The experiments with these solvents were performed in Li/MnO$_2$ cells of the type used in the previous examples. The control was 1M CF$_3$SO$_3$Li/70:30 BL+DME electrolyte. The results are given in Table IV for test under a 30.0Ω load to a 1.8 V cutoff. Of the ethers tested 1,2-dimethoxy propane performed best compared to the control.

the same as that used for MnO$_2$ cathodes described hereinbefore. All finished cathodes underwent a final drying at either 315° C. or 350° C. for 2 hours in vacuum immediately prior to their use in Li-anode cells.

Three variations of spirally-wound cells were prepared, with cathode lengths of either 8.89 cm (3.5"), 12,7 cm (5.0") or 13.72 cm (5.4"). In all cases, the active cathode face area was 4.06 cm (1.6") wide, rectangular, and had rounded corners. All cells had an anode of Li metal bonded to a stainless steel support.

The 8.89 cm cathodes were 0.46–0.56 mm (18–22 mils) thick and had a 0.10 mm (4 mil) stainless steel tab welded from the center of the upper edge to the lower face of the terminal stud. The anode was 0.254 mm (10 mil) thick Li laminated onto both sides of a continuous piece of 1 mil stainless steel foil. Different lengths of Li were used on each side because of a geometric winding effect that makes the length of Li covered by the inner cathode face of a wound cell shorter than that covered by the outer cathode face.

The 12.7 cm and 13.72 cm cathodes were 0.33–0.36 mm (13–14 mils) thick and were initially cut to 4.06 cm width. The uppermost 0.51 cm (0.2") of active area was then scraped free, exposing a continuous strip of bare grid along the entire upper edge of the cathode, leaving an active area 4.06 cm (1.6") wide. The grid strip then interlocked with the spiked crown-top in the finished ell to form the cathode-to-cap connection. The anode was a continuous strip of 0.33 mm (13-mil) thick Li with a 0.025 mm (1 mil) stainless tab laminated at each end for insertion into the core pin about which the cell was to be wound and for contact to the inner can wall at the trailing end. The anode assembly was only 3.8 cm (1.5") wide.

The separator (Celgard 2502) was V-folded around the leading edge of the cathode and was about 2 mm wider than the cathode at the top and bottom edges. To wind a cell, the cathode/separator composite was laid on top of the anode assembly with the anode leader previously placed in the core pin mandrel. After carefully winding with a manual winder, the finished internal cell assembly was inserted into an AA-size Ni-plated steel can. The can was then neck-crimped, filled with electrolyte by immersion under vacuum, capped, and cap-crimped to give the final can-negative cathode-limited cell.

TABLE IV

W-Fold Cell 80 mA Test Data (Room Temperature)

| Solvent Volume Percent | BL + DME 70:30 Comparison | PC + DEE 50:50 Comparison | PC + TBME 50:50 Comparison | PC + DMP 70:30 Invention | PC + DMP 60:40 Invention | PC + EME 60:40 Comparison |
|---|---|---|---|---|---|---|
| Conductivity (mmho/cm)[a] | 5.3 | 2.5 | 1.7 | 3.5 | 4.7 | 3.4 |
| No. Cells | 21 | 13 | 10 | 7 | 6 | 9 |
| g. Cathode | 5.93 | 5.95 | 5.99 | 5.95 | 5.96 | 5.92 |
| Avg. Current (mA) | 77.4 | 75.6 | 71.6 | 76.3 | 77.1 | 76.0 |
| % Coul. Yield | 66.6 | 47.4 | 32.3 | 52.9 | 56.7 | 53.4 |
| Life, Hours[b] | 11.6 | 8.5 | 6.1 | 9.4 | 9.9 | 9.5 |

[a]1 M CF$_3$SO$_3$Li solution
[b]Normalized to 5.95 g cathode

The following examples illustrate 1,2-dimethoxy propane containing electrolytes in Li/FeS$_2$ cells. The cells had a cathode consisting of a compressed dry mixture of pyrite (about 93% FeS$_2$), carbon, polytetrafluoroethylene (PTFE) and anatase-TiO$_2$ on a stainless steel grid support. The composition of the cathode was 87:4:6:3 weight percent pyrite/C/PTFE/TiO$_2$. The method of cathode coating, drying, calendering and blanking was After assembly all cells were predischarged galvanostatically at a current of 1.0 A to 3% depth-of-discharge based on the theoretical cathode capacity. Cells were then allowed to rest at least overnight before testing of any kind was performed.

EXAMPLE 10-11

The test performance of cells with 12.7 cm cathodes and 1M $CF_3SO_3Li$ in 1:1 (by volume) 3-methyl-2-oxazolidinone (MOZ): 1,2-DMP and ethylene carbonate (EC):1,2-DMP electrolytes is given in Table V. The test used was continuous discharge through a 3.9 ohms load to a cutoff of 0.75 volts, referred to as the 300 mA test. In both cases, a high level of cathodic fuel utilization was realized.

TABLE V 300 mA Test of Li/FeS$_2$ Cells* with 1,2-DMP-Containing Electrolytes (12.7 cm Cathodes)

| | Invention | Invention |
|---|---|---|
| Salt (1 M) | CF$_3$SO$_3$Li | CF$_3$SO$_3$Li |
| Solvent (1:1) | MOZ:1,2-DMP | EC:1,2-DMP |
| No. Cells | 4 | 3 |
| Coulombs FeS$_2$ (calculated) | 14586 ± 129 | 13364 ± 113 |
| Avg. Voltage (V) | 1.11 ± 0.00 | 1.17 ± 0.01 |
| Coulombs Delivered | 10677 ± 187 | 12205 ± 277 |
| % Coul. Yield | 73.2 ± 1.9 | 91.3 ± 2.7 |
| Life (hours) | 9.9 ± 0.2 | 10.2 ± 0.2 |

*The cathode was subjected to a 315° C. 2 hour heat treatment before cell assembly

EXAMPLE 12

In Table VI, the pulsed discharge of cells with 13.72 cm cathodes and 0.75 $CF_3SO_3Li$:0.25M $LiAsF_6$ in 1:1 PC:1,2-DMP was compared to that of similar cells with 1M $CF_3SO_3Li$ in 1:1 PC:1,3-dioxolane (DOX) and 1:1 PC:DME. The cells were evaluated by discharge through a 1.00 ohm load at a 25% duty cycle (15 seconds on then 45 seconds off) to a cutoff of 0.75 volts. This test is similar to a simulated photoflash test designated as ANSI 61, where the same discharge conditions are used except that the test is run for only 1 hour (60 cycles) per day. The average current density at the 13.72 cm cathode in this test was about 9 mA/cm$^2$. The performance of the cells with the 1,2-DMP-based electrolyte was superior to that of cells with the PC:DOX electrolyte and equivalent to that of the cells with the PC:DME electrolyte.

TABLE VI

Modified ANSI 61 Test of 13.72 cm Cells*

| | Invention | Comparison | Comparison |
|---|---|---|---|
| mol/L CF$_3$SO$_3$Li | 0.75 | 1.00 | 1.00 |
| mol/L LiAsF$_6$ | 0.25 | 0.00 | 0.00 |
| Solvent (1:1) | PC:1,2-DMP | PC:DME | PC:DOX |
| No. Cells | 5 | 4 | 5 |
| Coulombs FeS$_2$ (calculated) | 12881 ± 117 | 12890 ± 132 | 12938 ± 152 |
| Avg. Voltage (V) | 1.03 ± 0.01 | 1.03 ± 0.01 | 0.99 ± 0.00 |
| Avg. Power (W) | 1.06 ± 0.01 | 1.07 ± 0.02 | 0.97 ± 0.01 |
| Coul. Delivered | 9521 ± 126 | 9400 ± 226 | 8504 ± 211 |
| % Coulombic Yield | 73.9 ± 1.5 | 72.9 ± 2.3 | 65.7 ± 2.1 |
| Joules Delivered | 9785 ± 144 | 9726 ± 307 | 8374 ± 193 |
| No. Pulses | 618 ± 8 | 606 ± 10 | 576 ± 15 |

*350° C. 0.5 hour heat treatment of cathode before assembly

The invention has been described in detail with particular reference to preferred embodiments thereof, but it will be understood that variations and modifications can be effected within the spirit and scope of the invention.

We claim:

1. An electrochemical cell comprising a lithium anode, a cathode and an electrolyte (a) having a conductivity, and reciprocal ohms per cm, of at least 3.5 in (b) comprising a lithium salt, propylene carbonate and 1,2-dimethoxypropane.

2. The electrical cell of claim 1 wherein the volume ratio of 1,2-dimethoxypropane and propylene carbonate varies between 30-60 volume percent.

3. The electrochemical cell of claim 1 wherein the cathode is selected from $MnO_2$ and $FeS_2$.

4. The electrochemical cell of claim 3, 1 or 2 wherein the electrolyte comprises 0.5 to 1.5M lithium salt selected from $CF_3SO_3Li$ and $LiAsF_6$ and mixtures thereof.

5. The electrochemical cell of claim 3, 1 or 2 wherein the volume ratio is 1:1.

6. An electrochemical cell comprising a lithium anode, a cathode and an electrolyte having a conductivity, in reciprocal ohms per cm (mmho/cm), of at least 3.5, a lithium salt and a solvent mixture comprising
   (a) 10 to 40 volume percent propylene carbonate;
   (b) 20 to 40 volume percent ethylene carbonate; and
   (c) 30 to 60 volume percent 1,2-dimethoxypropane.

7. The electrochemical cell of claim 6 wherein the solvent mixture comprises
   (a) 10 to 25 volume percent propylene carbonate;
   (b) 25 to 40 volume percent ethylene carbonate; and
   (c) 50 volume percent 1,2-dimethoxypropane.

8. The electrochemical cell of claim 6 wherein the electrolyte solvent mixture comprises
   (a) 20 to 25 volume percent propylene carbonate;
   (b) 25 to 30 volume percent ethylene carbonate; and
   (c) 50 volume percent 1,2-dimethoxypropane.

9. The electrochemical cell of claim 6 wherein the electrolyte solvent mixture comprises
   (a) 30 volume percent propylene carbonate;
   (b) 30 volume percent ethylene carbonate; and
   (c) 40 volume percent 1,2-dimethoxypropane.

10. The electrochemical cell of claim 6 wherein the electrolyte solvent mixture comprises
    (a) 20 volume percent propylene carbonate;
    (b) 30 volume percent ethylene carbonate; and
    (c) 50 volume percent 1,2-dimethoxypropane.

11. The electrochemical cell of claim 6, 7, 8, 9 or 10 wherein the cathode is selected from $FeS_2$ and $MnO_2$.

12. The electrochemical cell of claim 6, 7, 8, 9 or 10 wherein the cathode is $MnO_2$.

13. The electrochemical cell of claim 6, 7, 8, 9 or 10 wherein the electrolyte comprises from 0.5 to 1.5M lithium salt selected from $CF_3SO_3Li$, $LiAsF_6$ and mixtures thereof.

14. The electrochemical cell of 6, 7, 8, 9 or 10 wherein the electrolyte comprises from 0.5 to 1.5M $CF_3SO_3Li$.

15. The electrochemical cell of claim 6, 7, 8, 9 or 10 wherein the electrolyte comprises 1 Molar $LiCF_3SO_3$.

* * * * *

UNITED STATES PATENT OFFICE
CERTIFICATE OF CORRECTION

PATENT NO. : 4,804,595
DATED : February 14, 1989
INVENTOR(S) : Vincent W. Bakos et al It is certified that error appears in the above-identified patent and that said Letters Patent is hereby corrected as shown below:

Col. 8, line 6, the part reading

"and reciprocal ohms per cm, of at least 3.5 in"

should read

--in reciprocal ohms per cm, of at least 3.5 and--

Signed and Sealed this

Twelfth Day of February, 1991

*Attest:*

HARRY F. MANBECK, JR.

*Attesting Officer*     *Commissioner of Patents and Trademarks*